United States Patent
Kwak (10) Patent No.: US 9,726,570 B2
(45) Date of Patent: Aug. 8, 2017

(54) TEST JIG FOR EXTERIOR DOOR HANDLE OF VEHICLE

(71) Applicant: Hyundai Motor Company, Seoul (KR)

(72) Inventor: Kyoung Taek Kwak, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 133 days.

(21) Appl. No.: 14/862,130

(22) Filed: Sep. 22, 2015

(65) Prior Publication Data

US 2016/0131562 A1    May 12, 2016

(30) Foreign Application Priority Data

Nov. 6, 2014    (KR) .................. 10-2014-0153446

(51) Int. Cl.
| | | |
|---|---|---|
| G01N 3/34 | (2006.01) | |
| G01M 7/08 | (2006.01) | |
| G01M 17/007 | (2006.01) | |

(52) U.S. Cl.
CPC .......... *G01M 7/08* (2013.01); *G01M 17/0078* (2013.01)

(58) Field of Classification Search
None
See application file for complete search history.

(56) References Cited

U.S. PATENT DOCUMENTS

| | | | | |
|---|---|---|---|---|
| 2,907,201 A | * | 10/1959 | Keener ................ | G01N 3/30 73/12.06 |
| 3,331,236 A | * | 7/1967 | Payne ................. | G01N 3/30 73/12.04 |
| 4,454,974 A | * | 6/1984 | Cooke ................. | A47K 10/40 225/106 |
| 5,476,130 A | * | 12/1995 | Cheng ................ | E06B 9/34 160/133 |
| 5,485,758 A |  | 1/1996 | Brown et al. | |
| 5,922,937 A | * | 7/1999 | Kowalski ............ | G01N 3/30 73/12.13 |
| 2014/0306048 A1 | * | 10/2014 | He .................... | A61J 7/0007 241/169.2 |

FOREIGN PATENT DOCUMENTS

| | | | |
|---|---|---|---|
| JP | 9-49780 A | 2/1997 | |
| JP | 2005207873 A | * 8/2005 | ............... G01N 3/31 |
| JP | 2012-137299 A | 7/2012 | |
| KR | 10-0146576 | 8/1998 | |
| KR | 10-0165774 B1 | 5/1999 | |
| KR | 10-0165776 B1 | 5/1999 | |
| KR | 10-1118959 B1 | 2/2012 | |
| KR | 10-1371254 B1 | 3/2014 | |

* cited by examiner

*Primary Examiner* — Matthew G Marini
*Assistant Examiner* — Ruben Parco, Jr.
(74) *Attorney, Agent, or Firm* — McDermott Will & Emery LLP (57) ABSTRACT

A test jig for an exterior door handle of a vehicle includes a first rotating shaft rotatably mounted on a vertical frame which is perpendicular to a horizontal frame that is supported on the ground. First plates are attached to both ends of the first rotating shaft to concurrently rotate with the first rotating shaft about a strike object by an elastic restoring force. A second rotating shaft is rotatably connected between the first plates. A second plate is attached to the second rotating shaft to concurrently rotate with the second rotating shaft about the strike object by the elastic restoring force when a handle is mounted.

12 Claims, 10 Drawing Sheets

▲ before collision

▲ condition of collision

- before collision -   - after collision -

TEST JIG FOR EXTERIOR DOOR HANDLE OF VEHICLE

CROSS-REFERENCE TO RELATED APPLICATION

This application claims under 35 U.S.C. §19(a) the benefit of priority to Korean Patent Application No. 10-2014-0153446 filed on Nov. 6, 2014, the entire content of which is incorporated herein by reference.

TECHNICAL FIELD

The present disclosure relates to a test jig for an exterior door handle of a vehicle. More particularly, the present disclosure relates to a test jig for an exterior door handle of a vehicle capable of evaluating side collision of the exterior door handle by simulating the side collision in which an inertial acceleration is generated on a door panel of the vehicle.

BACKGROUND

When a vehicle undergoes side collision, an inertia force may be generated on an exterior door handle so that the handle rotates in an opening direction of a door. In this case, the door may be opened, and a driver or a passenger can be pop out of the vehicle.

To prevent the above phenomenon, various door opening prevention devices and methods have been applied, for example, by mounting a balance weight on a handle lever to interlock with the exterior handle from inside a door panel or by increasing a spring momentum for interlocking with the exterior handle.

As a performance test on the above door opening prevention devices and methods, there is a side collision evaluation test conducted on an actual or prototype vehicle in which the door opening prevention device is mounted.

However, an improved device for preventing the door opening from the side collision is necessary and a side collision evaluation test must be carried out on the actual vehicle, thus increasing investment of cost and hours.

Furthermore, if there is a performance problem during the evaluation on the device for preventing the door opening on the actual vehicle, the device must be redesigned and the side collision test must be also reevaluated, thus further increasing costs.

In consideration of such problems, a separate evaluation tester has been used for simulating the actual vehicle side collision evaluation on the door opening prevention device before conducting the actual vehicle evaluation.

However, this separate evaluation tester requires a separate door assembly structure to create an acceleration of an actual vehicle condition and requires a separate collision barrier or object for a door assembly, thus increasing manufacturing cost and decreasing test efficiency. In addition, the door assembly has to be remanufactured when a reevaluation test is necessary, and different testers must be manufactured for different kinds of vehicles for various side collision tests.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure has been made in an effort to solve the above-described problems associated with prior art. An aspect of the present inventive concept provides a test jig for an exterior door handle of a vehicle capable of simulating vehicle side collision for evaluation in various conditions. Further, the test jig can evaluate the side collision on the exterior door handle of all kinds of vehicles according to setup conditions, by simulating inertial acceleration generating on a door panel of the vehicle, on which the exterior handle is mounted.

According to an exemplary embodiment of the present inventive concept, a test jig for an exterior door handle of the vehicle includes a first rotating shaft rotatably mounted on a vertical frame which is perpendicular to a horizontal frame that is supported on the ground. First plates are attached to both ends of the first rotating shaft to concurrently rotate with the first rotating shaft about a collision object by an elastic restoring force. A second rotating shaft is rotatably connected between the first plates. A second plate is attached to the second rotating shaft to concurrently rotate with the second rotating shaft about the collision object by an elastic restoring force in which a handle is attached on the second plate.

The first rotating shaft is rotatably supported by a plurality of first bearings mounted on the vertical frame, and the second rotating shaft is rotatably supported by a second bearing mounted on a bottom side of the first plate.

The first torsion spring providing a torsion moment to the first rotating shaft and the first plates is connected between the first rotating shaft and a lower end of the horizontal frame. An upper end of the first torsion spring is, with an upper rope, connected to a disc assembly mounted on the first rotating shaft. A lower end of the first torsion spring is, with a lower rope, connected to a hook formed on the horizontal frame.

A second torsion spring providing a torsion moment to the second rotating shaft and the second plate is connected between the first rotating shaft and the second rotating shaft. A rear end of the second torsion spring is, with a rear end rope, connected to a disc assembly mounted on the first rotating shaft. A forward end of the second torsion spring is, with a front end rope, connected to the disc assembly mounted on the second rotating shaft.

The disc assembly includes a first disc having a winding shaft and a second disc having an engaging hole to which the winding shaft is inserted. When the first disc and the second disc are combined in a condition where each rope is wound on the winding shaft, the first disc and the second disc are pressed and fixed to each other.

A fixed block to which the handle is attached is mounted on a bottom side of the second plate.

A rear end of the first plate and a rear end of the second plate closely adhere to the first rotating shaft and the second rotating shaft, respectively, and fixed by a U-shaped hook and a nut.

A first plate support spring, with which a forward end of the first plate collides to be elastically supported when the first plate rotates, is attached to a forward end of the horizontal frame as the collision object. A plurality of second plate support springs, with which a forward end of the second plate collides to be elastically supported when the second plate rotates, is attached behind the first plate support spring at the forward end of the horizontal frame as the collision object as the second plate rotates.

Other aspects and exemplary embodiments of the inventive concept are discussed infra.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present disclosure.

It should be understood that the appended drawings are not necessarily to scale, presenting a somewhat simplified representation of various features illustrative of the basic principles of the inventive concept. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present disclosure is intended to provide a test jig for an exterior door handle of a vehicle which can perform various side collision evaluations, such as stroke displacement and the like, of a handle for side collision by simulating inertial acceleration of a door panel having the handle.

Referring to FIGS. 1 to 11, a test jig of the present disclosure includes a horizontal frame 10 supported on a bottom and a vertical frame 12 integrally connected on one side of the horizontal frame 10.

Figure 1:
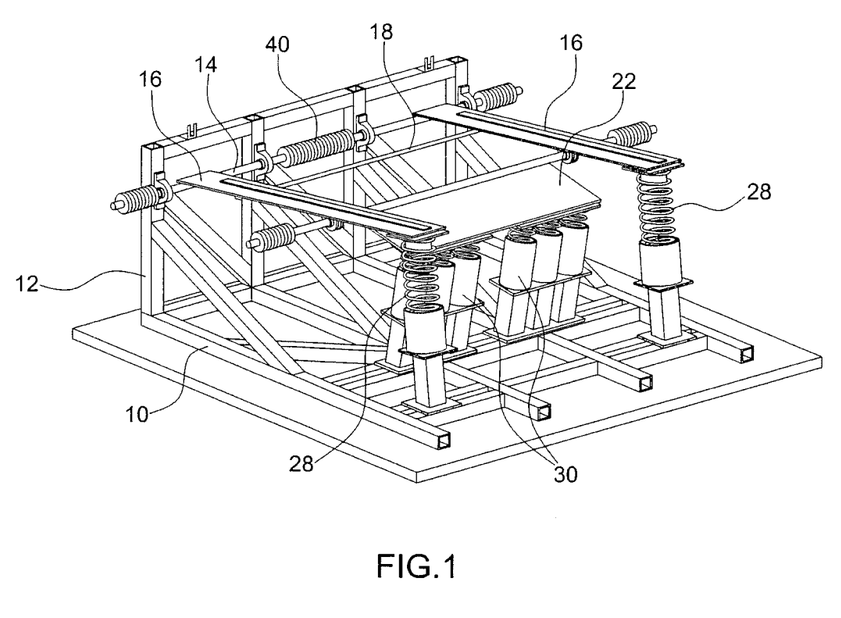
FIG. 1 is a perspective view of a test jig for an exterior door handle of a vehicle according to the present disclosure.
Figure 2:
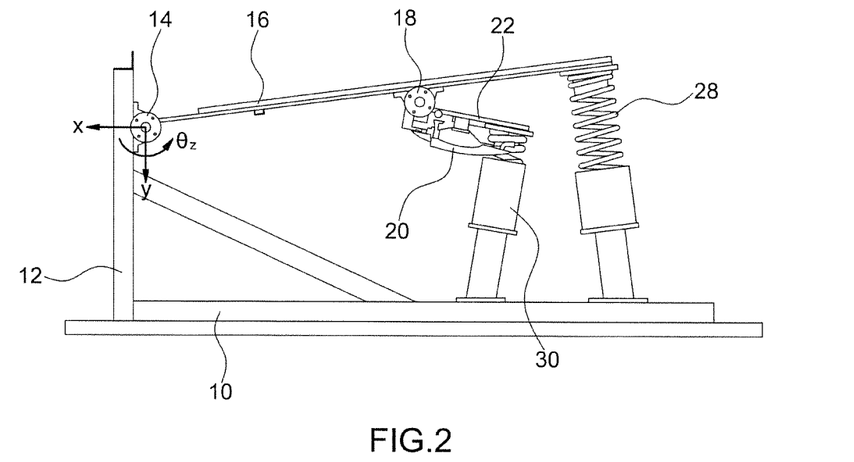
FIG. 2 is a side view of the test jig for an exterior door handle according to the present disclosure.
Figure 3:
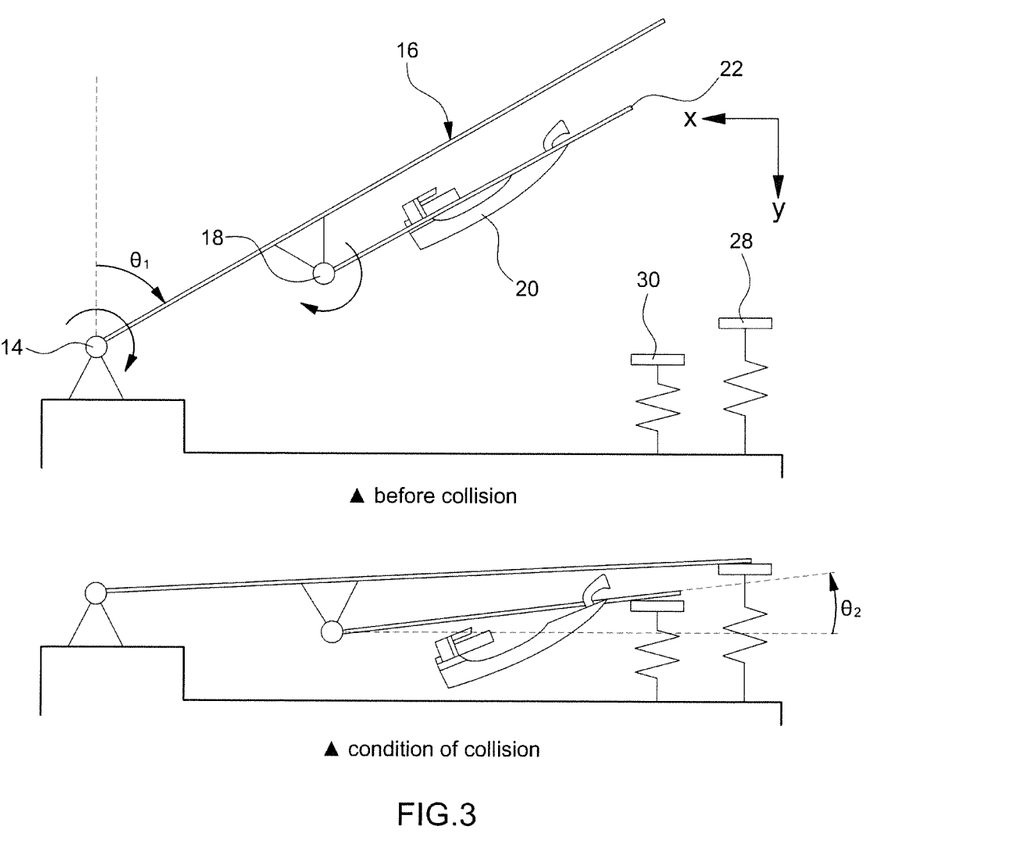
FIG. 3 is a conceptual view of the test jig for an exterior door handle according to the present disclosure.

A plurality of first bearings 32 are mounted on the vertical frame 12, and a first rotating shaft 14 is rotatably inserted in and mounted on the first bearings 32. Here, both ends of the first rotating shaft 14 are combined with each of first plates 16 which have an elongated rectangular sheet shape to be concurrently rotatable with the first rotating shaft 14.

Figure 8:
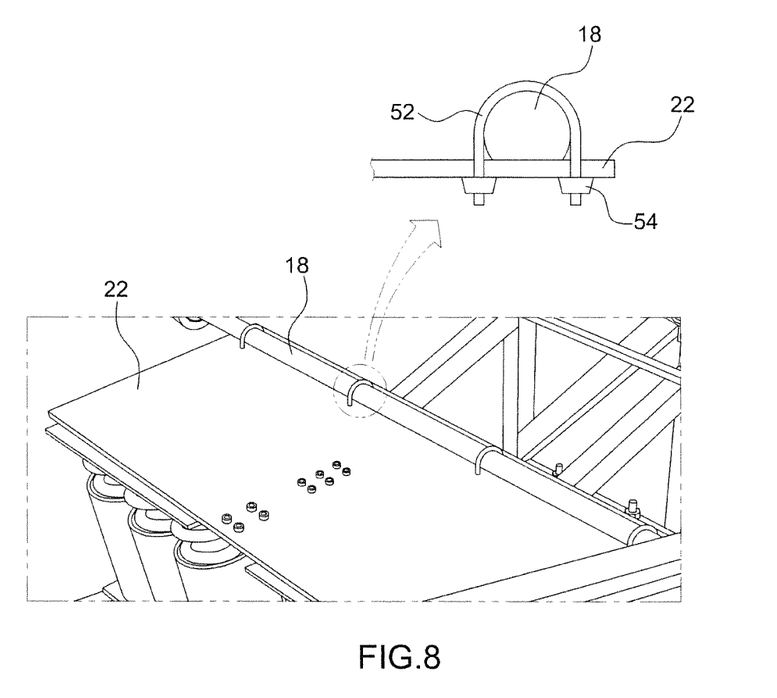
FIG. 8 illustrates a structure for an attachment of the first and second plates of the test jig for an exterior door handle according to the present disclosure.

More specifically, the first plate 16 is combined to the first rotating shaft 14 to concurrently rotate with the first rotating shaft 14, by closely contacting a rear end of the first plate 16 with an upper portion of the first rotating shaft 14. The first rotating shaft 14 is wrapped with a "U" shaped hook 52 in which the "U" shaped hook 52 protrudes upward from the first plate 16 and a nut 54 is screwed with the protruding "U" shaped hook 52.

A second rotating shaft 18 is rotatably connected between the first plates 16 and is rotatably inserted into and supported by a second bearing 34 mounted on a bottom side of the first plate 16. A second plate 22 is mounted to concurrently rotate at a middle portion of the second rotating shaft 18 which is connected between the first plates 16.

That is, referring to FIG. 8, the second plate 22 is combined to the second rotating shaft 18 so as to concurrently rotate with the second rotating shaft 18 by closely contacting a rear end of the second plate 22 to a lower portion of the second rotating shaft 18. Then the second rotating shaft 18 is wrapped with the "U" shaped hook 52, the "U" shaped hook 52 protrudes downward from the second plate 22, and the nut 54 is screwed with the protruding "U" shaped hook 52. Further, referring to FIGS. 9 and 10, a fixing block 50 to which a handle 20 is attached is mounted on a bottom side of the second plate 22.

Figure 9:
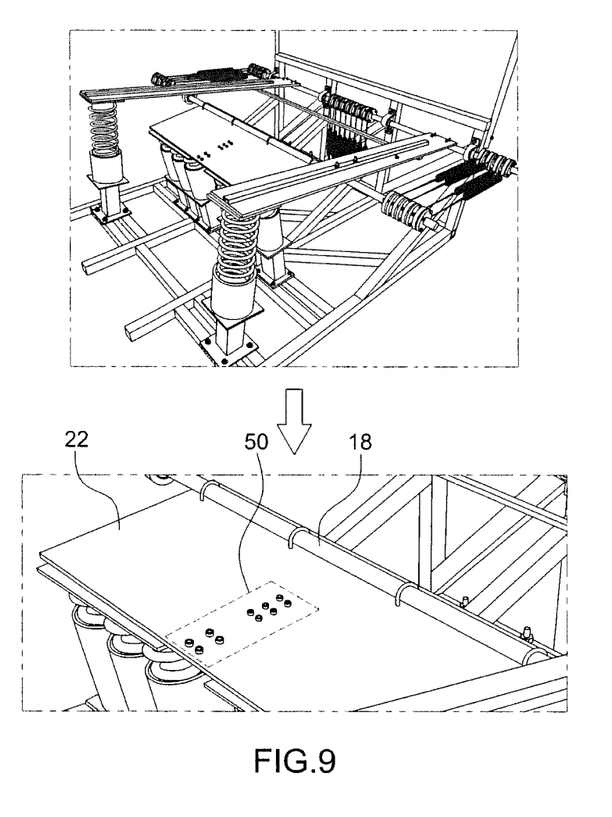
FIGS. 9 and 10 illustrate a structure for an attachment of an exterior handle as the actual product of the test jig for an exterior door handle according to the present disclosure.
Figure 10:
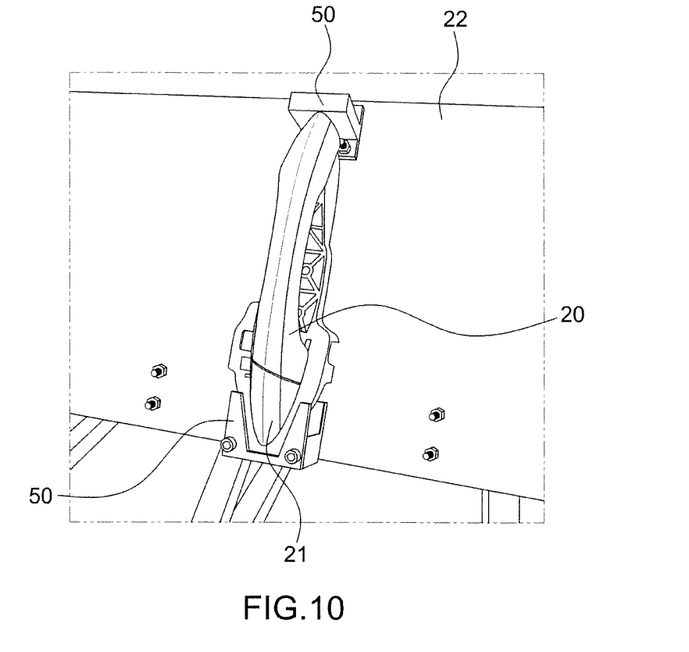

That is, the handle 20 as a test collision object is firmly secured to the fixing block 50, by arranging two fixing blocks 50 so as to hold both longitudinal ends of the handle 20, and screwing the fixing blocks 50 to the second plate 22.

Figure 4:
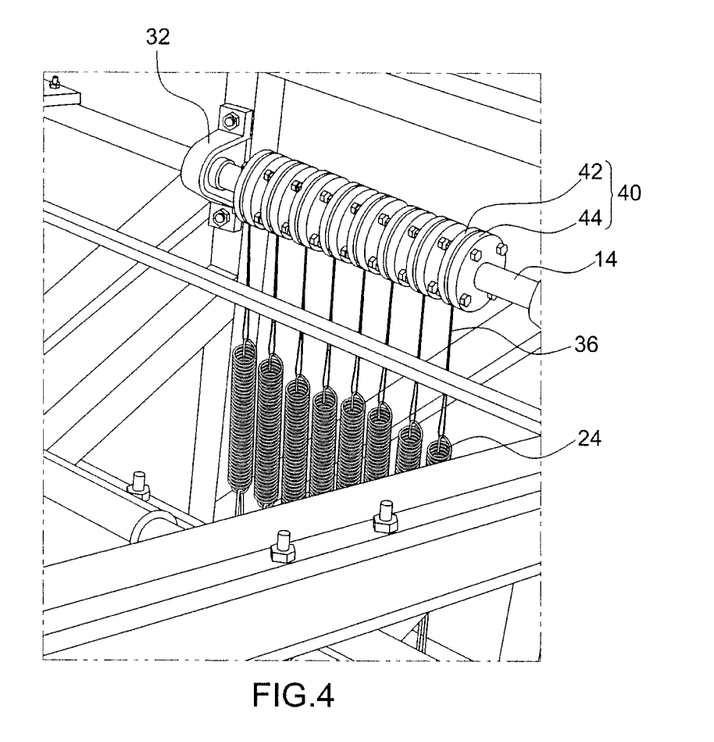
FIGS. 4 and 5 are enlarged perspective views of a portion for realization of a torsion moment of a first plate of the test jig for an exterior door handle according to the present disclosure.
Figure 5:
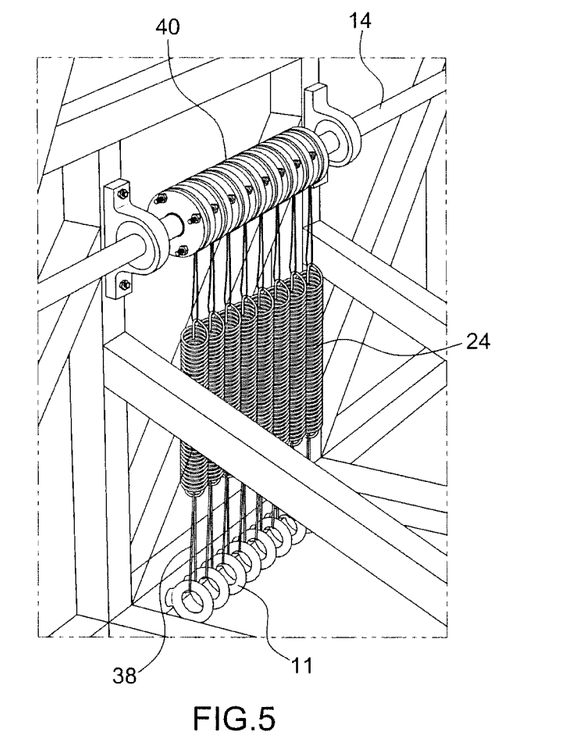

A first torsion spring 24 is connected between the first rotating shaft 14 and a lower end of the horizontal frame 10 to be tensioned. When the first rotating shaft 14 and the first plate 16 are lifted up vertically, the first torsion spring 24 is tensioned and provides a torsion moment to simulate a side collision of a door panel.

Referring to FIGS. 4 and 5, an upper end of the first torsion spring 24 is, with an upper rope 36 as a medium, connected to a disc assembly 40 mounted on the first rotating shaft 14. A lower end of the first torsion spring 24 is, with a lower rope 38 as a medium, connected to a hook 11 formed on the horizontal frame 10.

Figure 6:
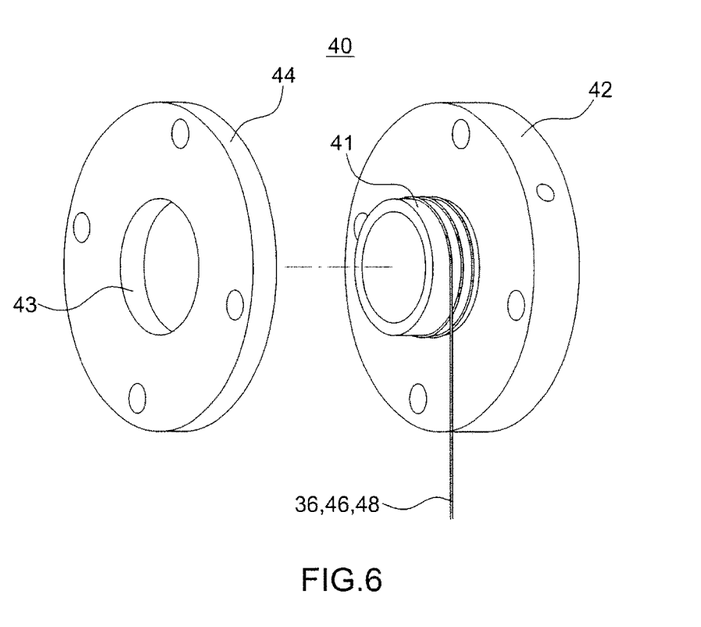
FIG. 6 is a perspective view of a disc assembly mounted on a rotating shaft for supporting a spring of the test jig for an exterior door handle according to the present disclosure.

As shown in FIG. 6, the disc assembly 40 consists of a first disc 42 having a winding shaft 41 and a second disc 44 having an engaging hole 43 to which the winding shaft 41 is inserted. Here, an upper end of the upper rope 36 is firmly fixed between the first disc 42 and the second disc 44, by inserting the winding shaft 41 into the engaging hole 43 in which the upper end of the upper rope 36 is wound on the winding shaft 41, and thereafter by combining the first disc 42 and the second disc 44 using a screw and the like.

Figure 7:
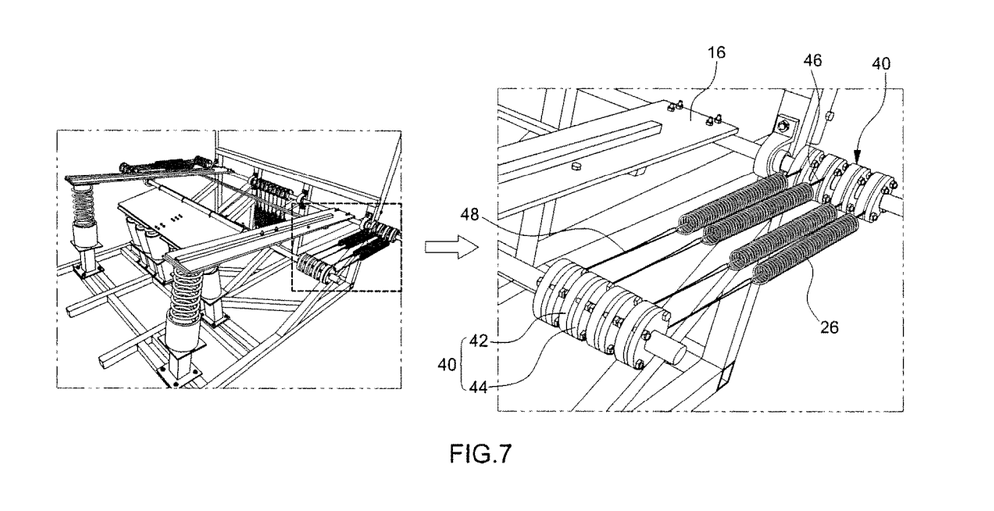
FIG. 7 is an enlarged perspective view of a portion for realization of torsion moment of a second plate of the test jig for an exterior door handle according to the present disclosure.

In addition, a second torsion spring 26 is connected between the first rotating shaft 14 and the second rotating shaft 18 to be tensioned. When the second rotating shaft 18 and the second plate 22 move vertically, the second torsion spring 26 is tensioned and provides a torsion moment to simulate a side collision of the door panel.

Referring to FIG. 7, a rear end of the second torsion spring 26 is, with a rear end rope 46 as a medium, connected to the disc assembly 40 mounted on the first rotating shaft 14. A forward end of the second torsion spring 26 is, with a forward end rope 48 as a medium, connected to the disc assembly 40 mounted on the second rotating shaft 18.

First plate support springs 28 are mounted vertically at both forward ends of the horizontal frames 10. The first plate support springs 28 elastically support a forward end of the first plate 16 when the first plate 16 rotates to be lowered down from a vertical state in a horizontal direction.

A plurality of second plate support springs 30 are mounted vertically behind the first plate support spring 28 at forward ends of the horizontal frames 10. The second plate support springs 30 elastically support a forward end of the second plate 22 when the second plate 22 rotates to be lowered down from the vertical state in a horizontal direction.

Hereafter, a test method utilizing the test jig for an exterior door handle of a vehicle of the present disclosure constructed as described above will be explained.

Figure 11:
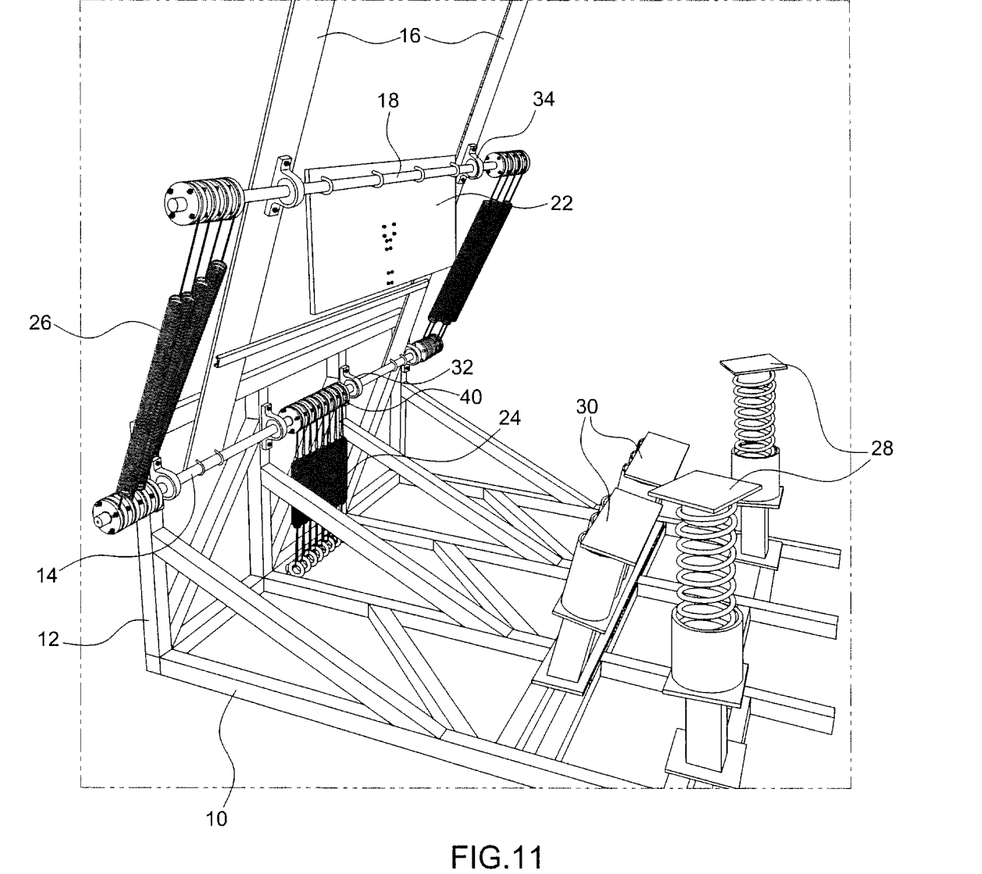
FIG. 11 is a perspective view showing a condition where the test jig for an exterior door handle according to the present disclosure is lifted for test.
Figure 12:
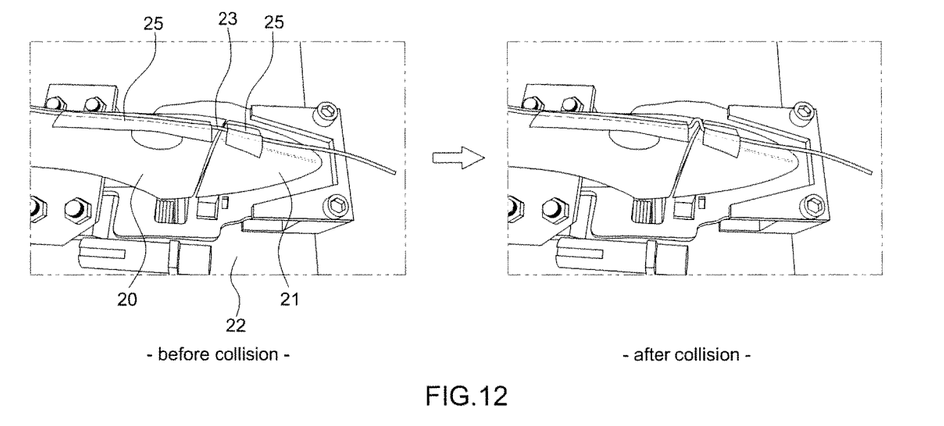
FIGS. 12 and 13 illustrate a test result of the test jig for an exterior door handle of the vehicle according to the present disclosure.

Referring to FIGS. 10 to 12, a handle cover 21 and the handle 20 assembled to the handle cover 21, which is to be pulled, are securely fixed to the fixed blocks 50 mounted on a bottom side of the second plate 22.

A wire 23 is attached to the handle 20 and the handle cover 21 with a tape 25 such that the wire 23 is exposed at a boundary of the handle 20 and the handle cover 21. Then, the vertical frame 12 is lifted.

The first and second plates 16 and 22 are lifted together, so that the first torsion spring 24 connected between the first rotating shaft 14 and the horizontal frame 10 and the second torsion spring 26 connected between the first rotating shaft 14 and the second rotating shaft 18 are in a condition of tension.

Thus, when the first and second plates 16 and 22 are lifted together and the first and second torsion springs 24 and 26 are tensioned, the door panel is in a condition of just prior to actual side collision.

When the first and second plates 16 and 22 are released, the vertical frame 12 is angularly rotated toward the first plate support spring 28 and the second plate support spring 30 by an elastic restoring force of the first and second torsion springs 24 and 26.

Then, the first plate 16 is lowered down from the vertical condition in the horizontal direction and concurrently strikes the first plate support spring 28, and at the same time the second plate 22 strikes the second plate support spring 30.

In this way, when the first and second plates 16 and 22 are dropped and strike the first plate support spring 28 and the second plate support spring 30, respectively, the door side collision in which a collision object seemingly strikes the door panel is simulated. When the handle 20 fixed to the fixed block 50 of the second plate 22 is side collided, an impact and an inertia force are applied.

Therefore, the impact and the inertia force are applied on the handle 20, so that the stroke by which the handle 20 is lifted toward an opening direction can be evaluated.

As a result of the door side collision test described above, the handle 20 is pulled by the inertia force and pushes the wire 23, whereby the wire 23 protrudes as shown in FIG. 12.

Here, the length of the protrusion of the wire 23 can be determined by a stroke length by which the handle 20 is pulled by the inertia force.

Figure 13:
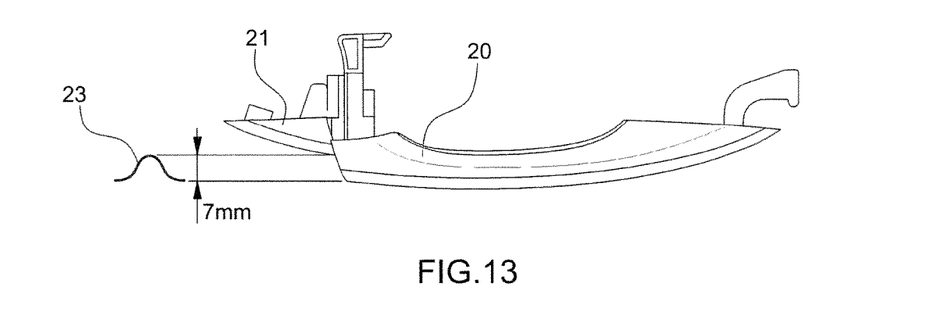

Referring to FIG. 13, as a result of comparison of the protrusion length of the wire 23 with the stroke length when pulling of the handle 20, it could be verified that a protrusion length of the wire 23 corresponds to the stroke by which the handle 20 is pulled for door opening.

As described above, while the conventional actual side collision test is conducted by striking the door panel with a collision barrier (side collision object), stroke of an exterior door handle due to the inertia force at the time of side collision can be precisely measured by striking the first plate and the second plate having the handle with the spring to simulate a vehicle door panel colliding with a collision barrier or object according to the embodiment.

Through the means for solving the above mentioned problems, the present disclosure provides the following effects:

First, while a conventional actual vehicle side collision test is carried out by making the barrier (side collision object) actually strike the door panel, the stroke of the door outside handle due to the inertia force upon side collision can be precisely measured by striking a with the first plate and the second plate to which the handle is attached to simulate the collision of the door panel and the barrier according to the present disclosure.

Second, acceleration occurring upon an actual vehicle side collision can be evaluated by applying a structure which can generate torsion moment to a rotating shaft to realize the acceleration occurring upon the vehicle collision.

Third, severity condition equivalent to the actual vehicle collision test can be realized only with initial setup condition setting, and the acceleration affecting opening of the handle can be realized regardless of the kind of vehicle and evaluation.

Fourth, manufacturing cost and test duration can be saved in comparison with the actual vehicle side collision test.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A test jig for an exterior door handle of a vehicle, the jig comprising:
    a first rotating shaft rotatably mounted on a vertical frame which is perpendicular and integrally connected to a horizontal frame that is supported on the ground;
    first plates attached to both ends of the first rotating shaft to rotate together with the first rotating shaft with respect to a collision object by an elastic restoring force;
    a second rotating shaft rotatably connected between the first plates; and
    a second plate attached to the second rotating shaft to rotate together with the second rotating shaft with respect to the collision object by the elastic restoring force when a handle is mounted.

2. The test jig of claim 1, wherein the first rotating shaft is rotatably supported by a plurality of first bearings mounted on the vertical frame.

3. The test jig of claim 1, wherein the second rotating shaft is rotatably supported by a second bearing mounted on a bottom side of the first plates.

4. The test jig of claim 1, further comprising a first torsion spring which is connected between the first rotating shaft and the horizontal frame and which provides a torsion moment to the first rotating shaft and the first plates.

5. The test jig of claim 4, wherein
an upper end of the first torsion spring is connected to a disc assembly mounted on the first rotating shaft with an upper rope, and
a lower end of the first torsion spring is connected to a hook formed on the horizontal frame with a lower rope.

6. The test jig of claim 1, further comprising a second torsion spring which is connected between the first rotating shaft and the second rotating shaft and which provides a torsion moment to the second rotating shaft and the second plate.

7. The test jig of claim 6, wherein a rear end of the second torsion spring is connected to a disc assembly mounted on the first rotating shaft with a rear end rope, and a forward end of the second torsion spring is connected to a disc assembly mounted on the second rotating shaft with a forward end rope.

8. The test jig of claim 1, further comprising: a disc assembly which includes a first disc having a winding shaft and a second disc having an engaging hole to which the winding shaft is inserted, wherein the first disc and the second disc are pressed and fixed to each other as the first disc and the second disc are combined while rope is wound on the winding shaft.

9. The test jig of claim 1, further comprising a fixed block mounted on a bottom side of the second plate to which the handle is attached.

10. The test jig of claim 9, further comprising:
a handle cover fixed to the fixed block with the handle;
a wire attached to the handle and the handle cover with a tape and exposed outside between the handle and the handle cover.

11. The test jig of claim 1, wherein a rear end of the first plates and a rear end of the second plate are close to the first rotating shaft and the second rotating shaft, respectively and are combined and fixed by using a U-shaped hook and a nut.

12. The test jig of claim 1, further comprising:
a first plate support spring, as the collision object, mounted at a forward end of the horizontal frame and elastically supporting the first plates when a forward end of the first plates collide with the first plate support spring as the first plates rotate; and
a plurality of second plate support springs, as the collision object, mounted at the forward end of the horizontal frame behind the first plate support spring and elastically supporting the second plate when a forward end of the second plate collides with the plurality of second plate support springs as the second plate rotates.

* * * * *

UNITED STATES PATENT AND TRADEMARK OFFICE
CERTIFICATE OF CORRECTION

PATENT NO. : 9,726,570 B2
APPLICATION NO. : 14/862130
DATED : August 8, 2017
INVENTOR(S) : Kyoung Taek Kwak It is certified that error appears in the above-identified patent and that said Letters Patent is hereby corrected as shown below:

On the Title Page

Column 1, (12) should read:
Kwak et al.

Column 1, (72) Inventor should read:
Kyoung Taek Kwak, Yongin-si (KR)
Lawrence A. Bergman, Urbana, IL (US)
Donald Michael McFarland, Urbana, IL (US)
Alexander Fotios Vakakis, Urbana, IL (US)
Randi J. Potekin, Urbana, IL (US)
Antoine Bertrand Emile Blanchard, Urbana, IL (US)

Column 1, (73) Assignee should read:
Hyundai Motor Company, Seoul (KR)
The Board of Trustees of the University of Illinois, Urbana, IL (US)

Signed and Sealed this
Twenty-fifth Day of October, 2022

Katherine Kelly Vidal
*Director of the United States Patent and Trademark Office*